May 10, 1932. J. L. KLECKNER 1,857,246
DOOR FOR RABBIT HUTCHES
Filed July 7, 1930 2 Sheets-Sheet 1
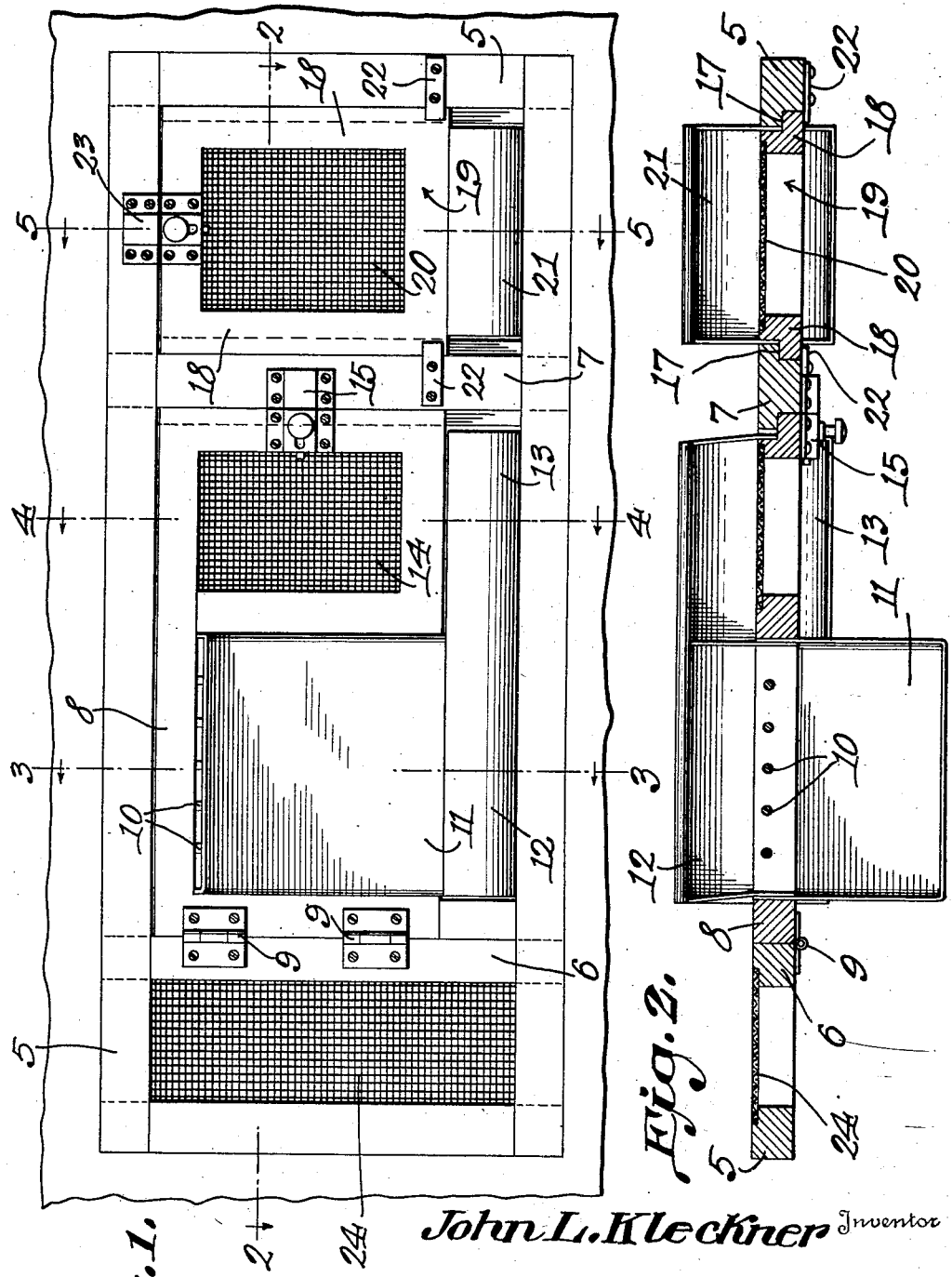
John L. Kleckner Inventor
By C.A. Snow & Co.
Attorneys.

May 10, 1932.    J. L. KLECKNER    1,857,246
DOOR FOR RABBIT HUTCHES
Filed July 7, 1930    2 Sheets-Sheet 2
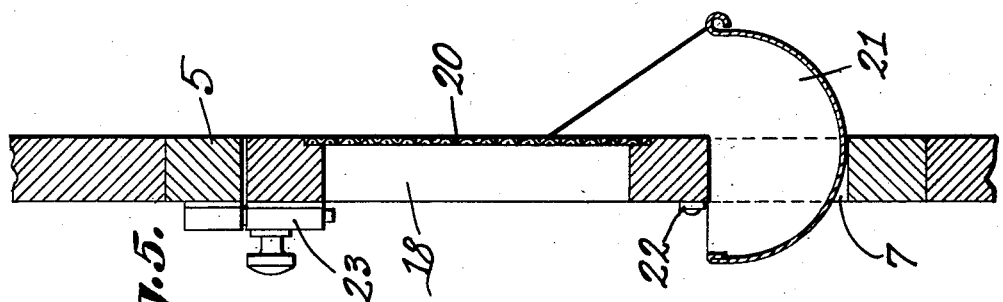
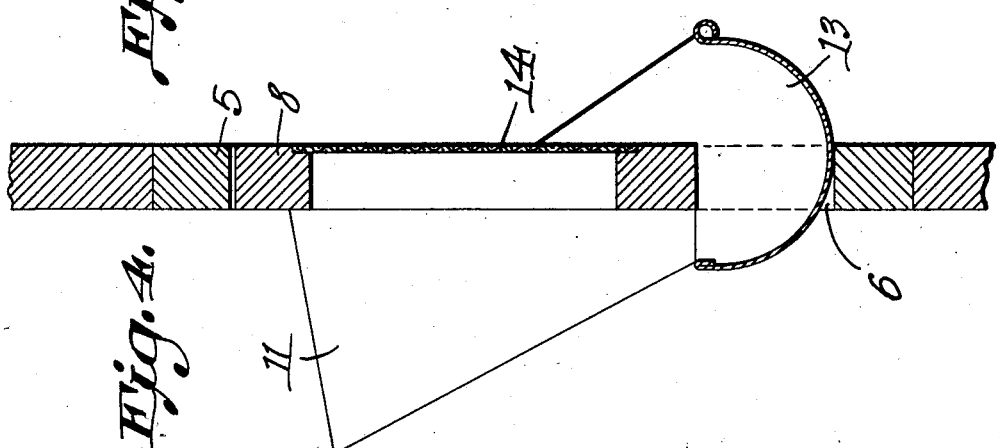
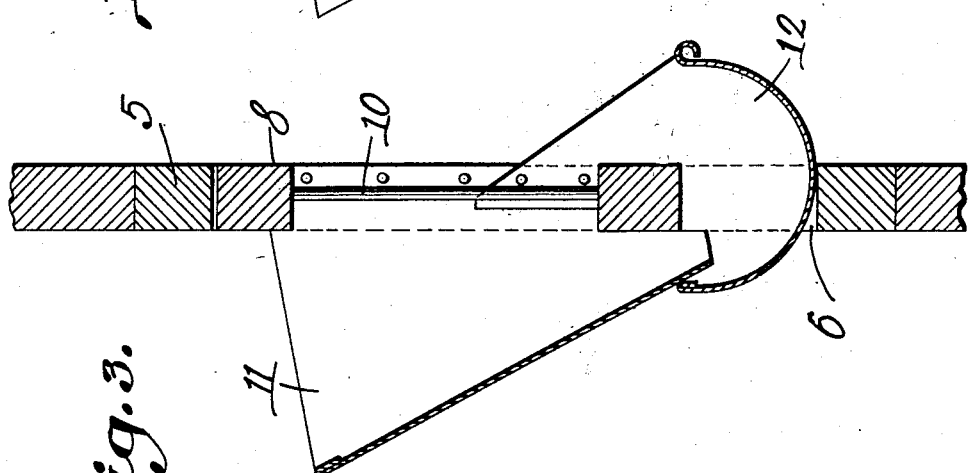
John L. Kleckner Inventor Patented May 10, 1932

1,857,246

UNITED STATES PATENT OFFICE

JOHN L. KLECKNER, OF SOUTH BEND, INDIANA

DOOR FOR RABBIT HUTCHES

Application filed July 7, 1930. Serial No. 466,317.

This invention relates to a door or closure for hutches, designed primarily for housing rabbits.

The primary object of the invention is to provide a door of this character having means to facilitate the feeding of the animals confined in the hutch.

Another object of the invention is to provide a removable door supplied with troughs accessible from both sides of the door, making it unnecessary to open the door to fill the troughs.

A still further object of the invention is to provide means for holding hay in such a way that the smaller pieces of hay will fall into a feed trough and will not be wasted on the floor of the hutch.

Another object of the invention is the provision of a removable watering trough, whereby the trough may be readily removed to remove ice therefrom, should ice form in the trough during cold weather.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a door constructed in accordance with the invention.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5 is a sectional view taken on line 5—5 of Figure 1.

Referring to the drawings in detail, the door comprises a rectangular frame indicated generally by the reference character 5, the frame including vertical bars 6 and 7 respectively, spaced from the ends of the frame.

The reference character 8 designates a hinged member which is in the form of a frame, connected to the bar 6, by means of the hinges 9. Supported by the frame or hinged member 8, are vertical rods 10 spaced apart, as clearly shown by Figure 2 of the drawings.

Secured to the hinged member 8 and disposed directly in front of the rods 10, is a hay retainer or chute 11 open at its bottom to discharge fine particles of hay into the trough 12, which is disposed on the inner side of the door or closure, the trough being arranged in such a way that rabbits or other small animals confined in the hutch may have ready access thereto. Disposed adjacent to the trough 12 is a trough 13 that has a portion thereof disposed on the inner side of the hinged member 8, and a portion thereof disposed on the outer side of the hinged member, to the end that feed such as grain or mash may be placed in the trough 13 from the outside of the door and the animals within the hutch may readily obtain the feed.

A length of wire mesh material indicated by the reference character 14 is secured to the hinged member, at a point directly above the trough 13, so that the air may circulate freely through the closure. A suitable latch member indicated by the reference character 15 is provided at one end of the hinged member 8, to hold the hinged member in its closed or active position, but permit the hinged member to be swung outwardly to facilitate the cleaning thereof.

The bar 7, and end bar of the frame of the door adjacent thereto, are formed with cut away portions defining recessed surfaces 17 to cooperate with the side bars 18 of the removable water trough section 19 which is supplied with wire mesh material 20 to permit air to pass therethrough. At the lower end of the water trough section is a water trough 21 which is of a construction so that a portion thereof extends beyond the front of the door, while a portion of the trough extends beyond the inner side of the door so that the rabbits may feed therefrom. Plates 22 are secured to the door and extend inwardly, overlying the recess portions of the bar 7 and end bar of the frame 5 associated therewith, so that the lower end of the water trough section 19 may be positioned behind the plates and held against movement, there being provided a latch member 23 at the upper end of the water trough section, to hold the upper end of the water trough section in position. Thus it will be obvious that due to this construction, the water trough section may be readily and easily removed and dropped into a receptacle containing hot water, to loosen ice in the trough section should ice form therein, during freezing weather. It will further be seen that hay may be placed in the chute 11 where the animals may gain access thereto, between the rods 10, the small particles of hay dropping into trough 12 where it may be eaten by the animals.

A length of wire mesh material indicated by the reference character 24 closes the space between the bar 6 and end bar of the frame associated therewith.

I claim:

1. A door for rabbit hutch, comprising a frame, said frame having recessed portions adjacent to one end thereof, plates secured to the frame and overlying the recessed portions, a removable water trough positioned within the recessed portions, a water trough section positioned within the recessed portion and contacting with the plates for holding the lower end of the watering trough section in position, and a latch member for holding the upper end of the watering trough section in position.

2. A door for rabbit hutch, comprising a frame, said frame having recessed portions adjacent to one end thereof, a removable water trough positioned within the recess portions, a water trough section positioned within the frame above the water trough, means on the frame and overlying the watering trough section to hold the lower end of the watering trough section in position, and a latch member for holding the upper end of the watering trough section in position.

In testimony that I claim the foregoing as my own, I have hereto affixed my signature.

JOHN L. KLECKNER.